US010657063B2

(12) United States Patent
Lu et al.

(10) Patent No.: US 10,657,063 B2
(45) Date of Patent: May 19, 2020

(54) DEVICE AND METHOD FOR ASSISTING PROCESSOR IN READING DATA

(71) Applicant: REALTEK SEMICONDUCTOR CORPORATION, Hsinchu (TW)

(72) Inventors: Yen-Ju Lu, Hsinchu (TW); Chao-Wei Huang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 20 days.

(21) Appl. No.: 16/034,868

(22) Filed: Jul. 13, 2018

(65) Prior Publication Data

US 2019/0018783 A1    Jan. 17, 2019

(30) Foreign Application Priority Data

Jul. 14, 2017   (TW) .............................. 106123704 A

(51) Int. Cl.

| G06F 12/00 | (2006.01) |
|---|---|
| G06F 12/0875 | (2016.01) |
| G06F 9/50 | (2006.01) |
| G06F 12/126 | (2016.01) |
| G06F 11/16 | (2006.01) |

(52) U.S. Cl.
CPC ........ *G06F 12/0875* (2013.01); *G06F 9/5016* (2013.01); *G06F 11/1666* (2013.01); *G06F 12/126* (2013.01)

(58) Field of Classification Search
CPC .. G06F 12/0875; G06F 12/126; G06F 9/5016; G06F 11/1666
USPC .................................................. 711/118, 125
See application file for complete search history.

(56) References Cited

U.S. PATENT DOCUMENTS

| 6,430,655 | B1 | 8/2002 | Courtright et al. | |
|---|---|---|---|---|
| 2004/0044848 | A1* | 3/2004 | Katayama | ............. G06F 9/3802 |
| | | | | 711/125 |
| 2014/0195737 | A1* | 7/2014 | Lilly | ................... G06F 12/0891 |
| | | | | 711/122 |

* cited by examiner

*Primary Examiner* — Mardochee Chery
(74) *Attorney, Agent, or Firm* — WPAT, PC

(57) ABSTRACT

The present invention discloses a data access device and method applicable to a processor. An embodiment of the data access device comprises: an instruction cache memory; a data cache memory; a processor circuit configured to read specific data from the instruction cache memory for the $N^{th}$ time and read the specific data from the data cache memory for the $M^{th}$ time, in which both N and M are positive integers and M is greater than N; a duplication circuit configured to copy the specific data from the instruction cache memory to the data cache memory when the processor circuit reads the specific data for the $N^{th}$ time; and a decision circuit configured to determine whether data requested by a read request from the processor circuit are stored in the data cache memory according to the read request.

10 Claims, 4 Drawing Sheets

DEVICE AND METHOD FOR ASSISTING PROCESSOR IN READING DATA

BACKGROUND OF THE INVENTION

1. Field of the Invention

The present invention relates to a data access device and a data access method, especially to a data access device and a data access method that are applicable to a processor.

2. Description of Related Art

In conventional art, a processor circuit uses pipeline operation. The stages of the pipeline operation include an instruction fetch stage, a decode stage, an execution stage, a data load/store stage and a register update stage. The above-mentioned stages can function concurrently, though each of the decode stage, the execution stage, the data load/store stage and the register update stage relies on the output of a preceding stage. Since the instruction fetch stage and the data load/store stage can function concurrently, the processor circuit is able to read instructions from an instruction cache memory in the instruction fetch stage and read data from a data cache memory in the data load/store stage simultaneously; however, the processor circuit may read data from the instruction cache memory in the data load/store stage in response to a request of some program execution. In light of the above, the processor circuit may be requested at substantially the same time to read instructions from the instruction cache memory in the instruction fetch stage and read data from the instruction cache memory in the data load/store stage, which leads to the instruction fetch stage and the data load/store stage contending for the opportunity to access the instruction cache memory, and results in one having to wait for the other one finishing accessing the instruction cache memory. Such contention obviously affects operation efficiency.

People who are interested in the related art may refer to the following literature: U.S. Pat. No. 6,430,655.

SUMMARY OF THE INVENTION

An object of the present invention is to provide a data access device and method applicable to a processor, so as to improve operation efficiency.

The present invention discloses a data access device applicable to a processor. An embodiment of the data access device includes: an instruction cache memory; a data cache memory; a processor circuit; a duplication circuit; and a decision circuit. The types of the instruction cache memory and the data cache memory could be the same or different; for instance, both the two memories are static random access memories (SRAMs). The processor circuit is configured to read specific data from the instruction cache memory for the $N^{th}$ time and read the specific data from the data cache memory for the $M^{th}$ time, in which both the N and the M are positive integers and the M is greater than the N. The duplication circuit is configured to copy the specific data from the instruction cache memory to the data cache memory when the processor circuit reads the specific data for the $N^{th}$ time. The decision circuit is configured to determine whether data requested by a read request from the processor circuit are stored in the data cache memory according to the read request. Accordingly, the data access device can reduce the chance of contending for the opportunity of accessing the instruction cache memory, and thereby reach better performance.

The present invention also discloses a data access method applicable to a processor. An embodiment of the data access method includes the following steps: reading specific data from an instruction cache memory for the $N^{th}$ time and read the specific data from a data cache memory for the $M^{th}$ time, in which both the N and the M are positive integers and the M is greater than the N; copying the specific data from the instruction cache memory to the data cache memory when reading the specific data for the $N^{th}$ time; and determining whether data requested by a read request are stored in the data cache memory according to the read request. The types of the above-mentioned instruction cache memory and the above-mentioned data cache memory could be the same or different; for instance, both the two memories are static random access memories (SRAMs). Accordingly, the data access method can reduce the chance of contending for the opportunity of accessing the instruction cache memory, and thereby reach better performance.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this industrial field. If any term is defined in this specification, such term should be explained accordingly.

The present disclosure includes a data access device and a data access method that are applicable to a processor. The device and the method can reduce the chance of different operation stages of a processor circuit contending for the opportunity of accessing the same instruction cache memory, and thereby reach better performance.

Figure 1:
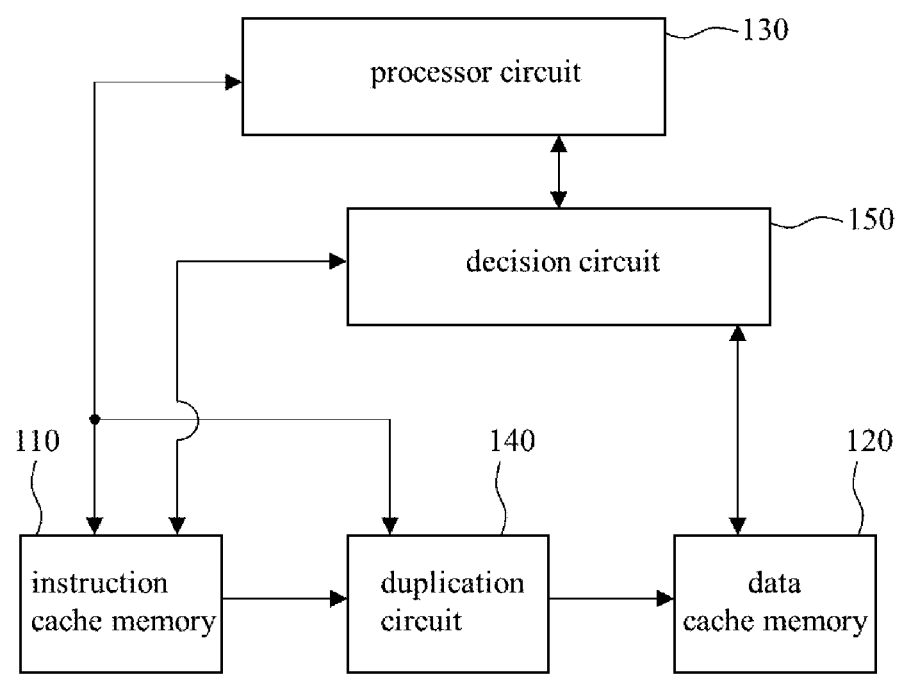
FIG. 1 shows the functional block diagram according to an embodiment of the data access device of the present invention.

Please refer to FIG. 1 which shows an embodiment of the data access device of the present invention. The data access device 100 of FIG. 1 includes: an instruction cache memory 110; a data cache memory 120; a processor circuit 130; a duplication circuit 140; and a decision circuit 150. In a non-restrictive embodiment, the software/firmware and the hardware of at least one of the duplication circuit 140 and the decision circuit 150 are integrated into the data cache memory 120, so that the data cache memory 120 provides multiple functions. In another non-restrictive embodiment, the software/firmware and the hardware of at least one of the duplication circuit 140 and the decision circuit 150 are integrated into the instruction cache memory 110, so that the instruction cache memory 110 provides multiple functions.

In the embodiment of FIG. 1, the instruction cache memory 110 and the data cache memory 120 could be memories of the same type or different types. For instance, both the two memories are static random access memories (SRAMs) rather than dynamic random access memories (DRAMs). However, the instruction cache memory 110 and the data cache memory 120 are not exactly the same in function. For instance, the instruction cache memory 110 is a scratchpad memory (SPM) and the data cache memory 120 is a cache memory, in which data in the instruction cache memory 110 remain unchanged during a normal operation of the processor circuit 130 and data in the data cache memory 120 remain unchanged or are changed (i.e., data in the data cache memory 120 could be changed) during the normal operation of the processor circuit 130. An example of the normal operation is an operation starts from the processor circuit 130 finishing a start-up procedure and ends before the processor circuit 130 restarting the start-up procedure. It should be noted that the instruction cache memory 110 and the data cache memory 120 could be the other kinds of memories such as magnetoresistive random access memories (MRAMs), phase change random access memories (PCRAMs), resistive random access memories (PRAMs), etc. It should be also noted that the type of the instruction cache memory 110 could be different from the type of the data cache memory 120.

In the embodiment of FIG. 1, for the $N^{th}$ (e.g., first, that is to say $N^{th}=1^{th}$) time the processor circuit 130 reading a specific data, the processor circuit 130 reads the specific data from the instruction cache memory 110; for the $M^{th}$ (e.g., second or higher ordinal number, that is to say $M^{th}>1^{th}$) time the processor circuit 130 reading the specific data, the processor circuit 130 reads the specific data from the data cache memory 120, in which both the N and the M are positive integers and the M is greater than the N. An example of the specific data is a literal constant such as the ratio of the circumference of a circle to its diameter (i.e., $\pi$) however, this is just exemplary for understanding, and people of ordinary skill in the art can determine what data in the instruction cache memory 110 will be treated as the specific data in accordance with their demand. It should be noted that the processor circuit 130 reads the specific data from the instruction cache memory 110 for the $N^{th}$ time in an instruction fetch stage, the instruction fetch stage is one of several operation stages of the processor circuit 130, and at least two of the operation stages (e.g., the instruction fetch stage and a data access stage (a.k.a. data load/store stage)) can function at the same time for the execution of pipeline operation. The above-mentioned operation stages and the pipeline operation are well known in this industrial field, and their details are omitted here. It should be also noted that the transmission between the instruction cache memory 110 and the processor circuit 130 could be single port transmission or multiport transmission; when the transmission between the instruction cache memory 110 and the processor circuit 130 is single port transmission, the instruction cache memory 110 is unable to provide data for the processor circuit 130 according to two different read requests (which come from different operation stages of the processor circuit 130) at the same time.

In the embodiment of FIG. 1, when the processor circuit 130 reads the specific data for the $M^{th}$ time, the duplication circuit 140 copies the specific data from the instruction cache memory 110 to the data cache memory 120, so that the processor circuit 130 can read the specific from the data cache memory 120 afterwards. In detail, the processor circuit 130 can read the specific data from the data cache memory 120 according to a read request, and the duplication circuit 140 can determine whether the aforementioned duplication operation should be carried out according to the read request. For instance, the duplication circuit 140 can determine whether the duplication operation should be carried out according to the memory address information or some other predetermined term (e.g., whether the access time(s) of the data (i.e., the specific data) requested by the read request reach(es) a predetermined threshold) associated with the read request.

In the embodiment of FIG. 1, the decision circuit 150 is configured to determine whether data requested by a read request of the processor circuit 130 are stored in the data cache memory 120 according to the read request. The decision circuit 150 can further determine whether the data requested by the read request are stored in the instruction cache memory 110 according to the read request; or the decision circuit 150 determines that the data requested by the read request are not stored in the data cache memory 120 first, and then determines whether the data requested by the read request are stored in the instruction cache memory 110. It should be noted that the processor circuit 130 sends out the read request in a data access stage; in other words, the decision circuit 150 makes the above-mentioned decision during the data access stage which is one of several operation stages of the processor circuit 130. At least two stages (e.g., the data access stage and an instruction fetch stage) of the operation stages can function concurrently for the execution of pipeline operation. The operation stages and the pipeline operation are well known in this industrial field, and their details are omitted here.

Figure 2:
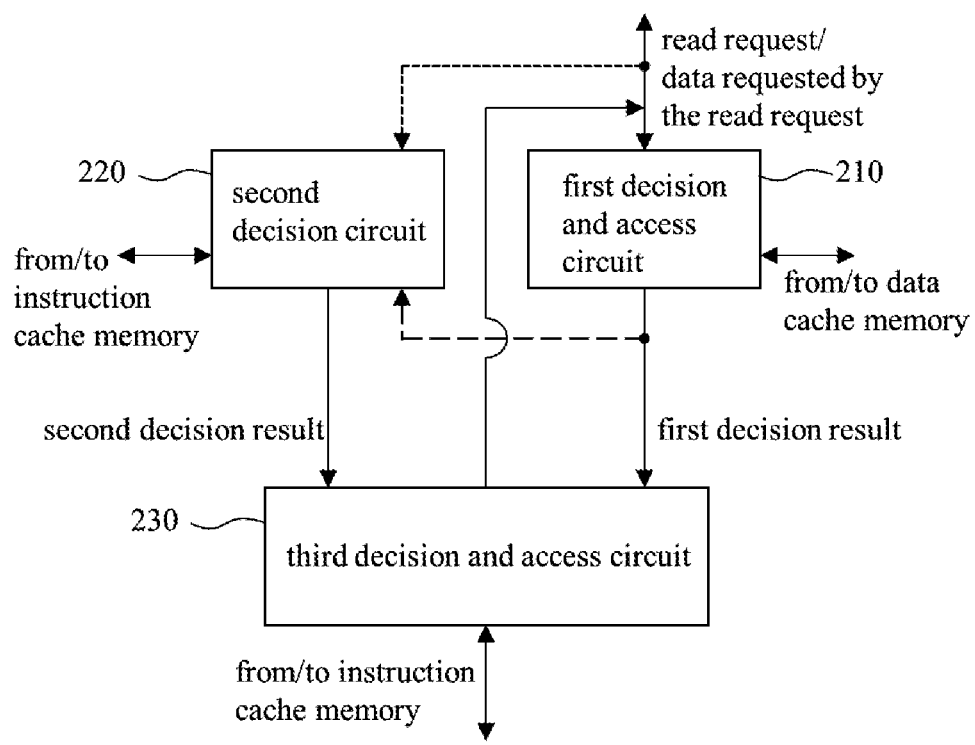
FIG. 2 shows the functional block diagram according to an embodiment of the decision circuit of FIG. 1.

Please refer to FIG. 2 showing an embodiment of the decision circuit 150 of FIG. 1. As shown in FIG. 2, the decision circuit 150 includes a first decision and access circuit 210, a second decision circuit 220, and a third decision and access circuit 230. The first decision and access circuit 210 is configured to determine whether the data requested by the read request are stored in the data cache memory 120 according to the read request, and transmit the data in the data cache memory 120 requested by the read request to the processor circuit 130 after determining that the data requested by the read request are stored in the data cache memory 120; additionally, the first decision and access circuit 210 is further configured to output a first decision result after determining that the data requested by the read request are not stored in the data cache memory 120. The second decision circuit 220 is configured to start determining whether the data requested by the read request are stored in the instruction cache memory 110 according to the read request (as shown by the dotted line in FIG. 2) or the first decision result (as shown by the dashed line in FIG. 2), and thereby output a second decision result. The third decision and access circuit 230 is configured to transmit the data in the instruction cache memory 110 requested by the read request to the processor circuit 130 when the first decision result indicates that the data requested by the read request are absent in the data cache memory 120 and the second decision result indicates that the data requested by the read request are stored in the instruction cache memory 110. It should be noted that the first decision and access circuit 210 can determine whether the data requested by the read request are stored in the data cache memory 120 according to the memory address information and/or some identification information (e.g., tag information, which can be stored in the data cache memory 120, associated with data stored in the data cache memory 120) related to the read request, and the second decision circuit 220 can determine whether the data requested by the read request are stored in the instruction cache memory 110 according to the memory address information related to the read request.

In light of the above, by the duplication operation of the duplication circuit 140 and the decision operation of the decision circuit 150, the data access device 100 of FIG. 1 reduces the chances of different stages of the processor circuit 130 accessing the instruction cache memory 110 during the data access stage, and thereby reduces the chances of the different stages contending for the opportunity of accessing the instruction cache memory 110, so that the operation efficiency is improved.

Figure 3:
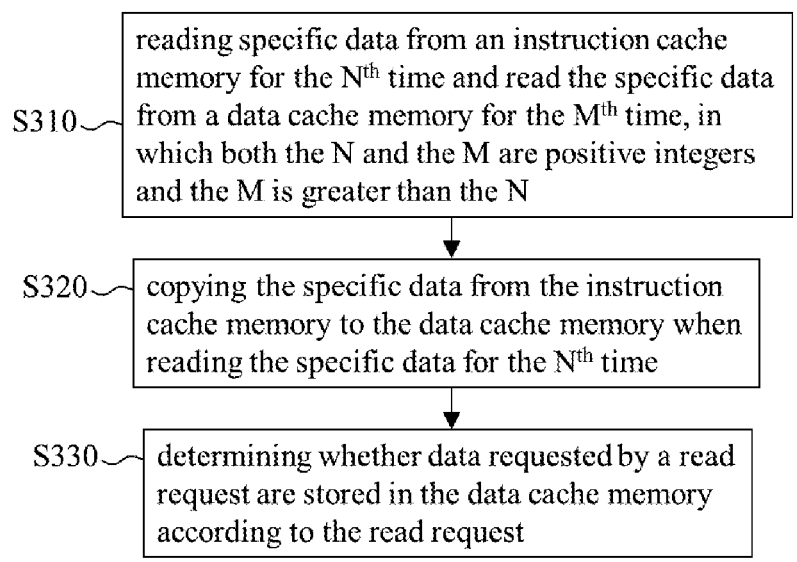
FIG. 3 shows a flow chart according to an embodiment of the data access method of the present invention.

In addition to the aforementioned data access device, the present invention also discloses a data access method. An embodiment of the method is shown in FIG. 3. This embodiment can be carried out by the data access device 100 of FIG. 1 or the equivalent thereof, and includes the following steps:

Step S310: reading specific data from an instruction cache memory (e.g., the instruction cache memory 110 of FIG. 1 or the equivalent thereof) for the $N^{th}$ time and read the specific data from a data cache memory (e.g., the data cache memory 120 of FIG. 1 or the equivalent thereof) for the $M^{th}$ time, in which both the N and the M are positive integers and the M is greater than the N. The abovementioned instruction cache memory and the abovementioned data cache memory could be memories of the same type or different types. Step S310 can be carried out by the processor circuit 130 of FIG. 1 or the equivalent thereof.

Step S320: copying the specific data from the instruction cache memory to the data cache memory when reading the specific data for the $N^{th}$ time. Step S320 can be carried out by the duplication circuit 140 of FIG. 1 or the equivalent thereof.

Step S330: determining whether data requested by a read request are stored in the data cache memory according to the read request. Step S330 can be carried out by the decision circuit 150 or the equivalent thereof.

Figure 4:
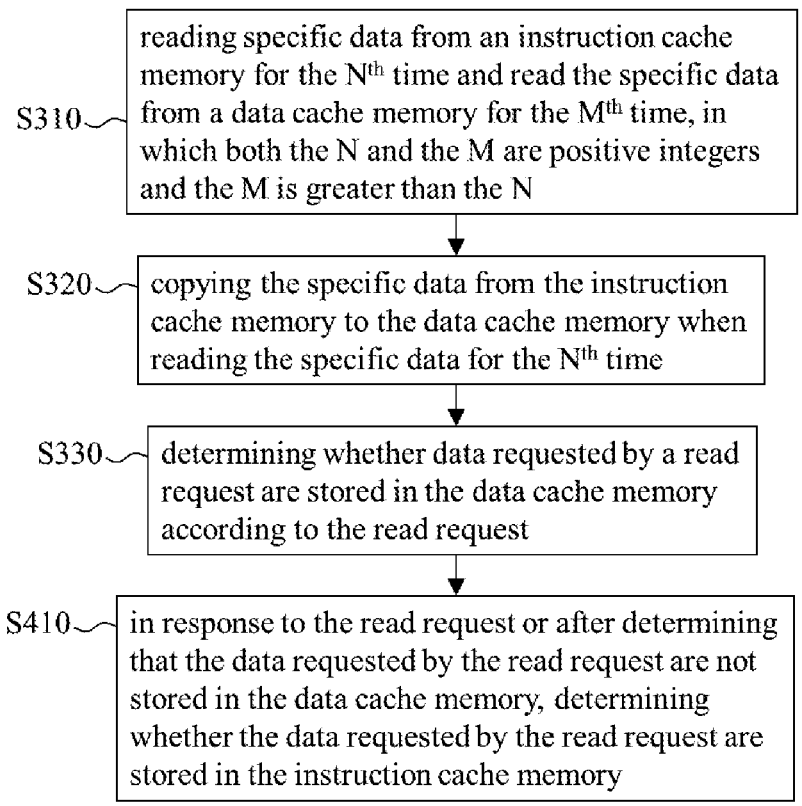
FIG. 4 shows a flow chart according to another embodiment of the data access method of the present invention.

Please refer to FIG. 4 showing another embodiment of the aforementioned data access method. In comparison with FIG. 3, the embodiment of FIG. 4 further includes the following step:

Step S410: in response to the read request or after determining that the data requested by the read request are not stored in the data cache memory, determining whether the data requested by the read request are stored in the instruction cache memory. Step S410 can be carried out by the decision circuit 150 of FIG. 1 or the equivalent thereof.

Since people of ordinary skill in the art can appreciate the details and the modifications of the method embodiments of FIGS. 3~4 by referring to the disclosure of the device embodiments of FIGS. 1~2, which means that the characteristics of the device embodiments can be applied to the method embodiments in a reasonable way, repeated and redundant description is therefore omitted here providing the written description and enablement requirements are still satisfied.

In summary, the data access circuit and method of the present invention can reduce the chances of different operation stages of a processor circuit contending for the opportunity of accessing the same instruction cache memory, and thereby reach better performance.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A data access device applicable to a processor, comprising:
   an instruction cache memory;
   a data cache memory;
   a processor circuit configured to read specific data from the instruction cache memory for a $N^{th}$ time and read the specific data from the data cache memory for a $M^{th}$ time, in which both the N and the M are positive integers and the M is greater than the N;
   a duplication circuit configured to copy the specific data from the instruction cache memory to the data cache memory when the processor circuit reads the specific data for the $N^{th}$ time; and
   a decision circuit configured to determine whether data requested by a read request from the processor circuit are stored in the data cache memory according to the read request.

2. The data access device of claim 1, wherein both the instruction cache memory and the data cache memory are static random access memories (SRAMs).

3. The data access device of claim 1, wherein the decision circuit determines whether the data requested by the read request are stored in the instruction cache memory according to the read request, or the decision circuit determines whether the data requested by the read request are stored in the instruction cache memory after the decision circuit determines that the data requested by the read request are not stored in the data cache memory.

4. The data access device of claim 1, wherein transmission between the instruction cache memory and the processor circuit is single port transmission.

5. The data access device of claim 1, wherein operation stages of the processor circuit include an instruction fetch stage and a data access stage, the instruction fetch stage and the data access stage are capable of being carried out concurrently, the processor circuit sends the read request in the data access stage so as to access the instruction cache memory after the processor circuit fails to read the data requested by the read request from the data cache memory, and the processor circuit is capable of accessing the instruction cache memory in the instruction fetch stage.

6. The data access device of claim 1, wherein data in the instruction cache memory remain unchanged during a normal operation of the processor circuit, data in the data cache memory remain unchanged or are changed during the normal operation of the processor circuit, and the normal operation starts from the processor circuit finishing a start-up procedure and ends before the processor circuit restarting the start-up procedure.

7. The data access device of claim 1, wherein the decision circuit includes:
   a first decision and access circuit configured to determine whether the data requested by the read request are stored in the data cache memory according to the read request and transmit the data in the data cache memory requested by the read request to the processor circuit after determining the data requested by the read request are stored in the data cache memory, and the first decision and access circuit further configured to output a first decision result after determining the data requested by the read request are not stored in the data cache memory;

a second decision circuit configured to determine whether the data requested by the read request are stored in the instruction cache memory according to the read request or the first decision result, and thereby output a second decision result; and a third decision and access circuit configured to transmit the data in the instruction cache memory requested by the read request to the processor circuit when the first decision result indicates that the data requested by the read request are absent in the data cache memory and the second decision result indicates that the data requested by the read request are stored in the instruction cache memory.

8. A data access method applicable to a processor and carried out by a data access device, the data access method comprising:

reading specific data from an instruction cache memory for a $N^{th}$ time and read the specific data from a data cache memory for a $M^{th}$ time, in which both the N and the M are positive integers and the M is greater than the N;

copying the specific data from the instruction cache memory to the data cache memory when reading the specific data for the $N^{th}$ time; and determining whether data requested by a read request are stored in the data cache memory according to the read request.

9. The data access method of claim 8, wherein data in the instruction cache memory remain unchanged during a normal operation of the data access device, data in the data cache memory are changed during the normal operation of the data access device, and the normal operation starts from the data access device finishing a start-up procedure and ends before the data access device restarting the start-up procedure.

10. The data access method of claim 8, further comprising:

after determining the data requested by the read request are stored in the data cache memory, outputting the data in the data cache memory requested by the read request;

after determining the data requested by the read request are not stored in the data cache memory, outputting a first decision result;

determining whether the data requested by the read request are stored in the instruction cache memory according to the read request or the first decision result, and thereby outputting a second decision result; and when the first decision result indicates that the data requested by the read request are absent in the data cache memory and the second decision result indicates that the data requested by the read request are stored in the instruction cache memory, outputting the data in the instruction cache memory requested by the read request.

* * * * *